(12) United States Patent
Bara et al.

(10) Patent No.: US 8,207,515 B2
(45) Date of Patent: Jun. 26, 2012

(54) CASING INTERNAL PART AND CASING FOR THE DRY INTERMEDIATE STORAGE OF IRRADIATED FUEL ELEMENTS, AND INTERMEDIATE STORAGE METHOD

(75) Inventors: Jacques Bara, Hermeray (FR); Daniel Mottier, Levis Saint Nom (FR)

(73) Assignee: Areva NC, Paris (FR)

( * ) Notice: Subject to any disclaimer, the term of this patent is extended or adjusted under 35 U.S.C. 154(b) by 15 days.

(21) Appl. No.: 12/999,352

(22) PCT Filed: Jun. 16, 2009

(86) PCT No.: PCT/FR2009/051147
§ 371 (c)(1),
(2), (4) Date: Jan. 7, 2011

(87) PCT Pub. No.: WO2009/153520
PCT Pub. Date: Dec. 23, 2009

(65) Prior Publication Data
US 2011/0108746 A1      May 12, 2011

(30) Foreign Application Priority Data
Jun. 17, 2008   (FR) ..................... 08 53975

(51) Int. Cl.
*G21C 19/06* (2006.01)
*G21F 5/12* (2006.01)
*G21F 5/10* (2006.01)
(52) U.S. Cl. ............... 250/507.1; 250/505.1; 250/506.1; 376/272
(58) Field of Classification Search ............... 250/505.1, 250/506.1, 507.1; 376/272
See application file for complete search history.

(56) References Cited

U.S. PATENT DOCUMENTS

| | | | | |
|---|---|---|---|---|
| 4,636,351 A * | 1/1987 | Rohr | ............................ | 376/272 |
| 4,930,650 A * | 6/1990 | Wells | ............................ | 220/507 |
| 5,373,540 A * | 12/1994 | DeCooman et al. | .......... | 376/272 |
| 5,848,111 A * | 12/1998 | Wells et al. | .................... | 376/272 |
| 5,898,747 A * | 4/1999 | Singh | ............................ | 376/272 |
| 5,909,475 A * | 6/1999 | Wells et al. | .................... | 376/272 |
| 6,064,710 A * | 5/2000 | Singh | ............................ | 376/272 |
| 6,625,247 B1 * | 9/2003 | Ohsono et al. | ................. | 376/272 |
| 6,665,365 B2 * | 12/2003 | Dallongeville et al. | ....... | 376/272 |
| 6,878,952 B1 * | 4/2005 | Ohsono et al. | ............. | 250/506.1 |
| 7,129,501 B2 * | 10/2006 | Iwanczyk et al. | ........ | 250/370.15 |
| 7,836,597 B2 * | 11/2010 | Datta et al. | ............... | 29/890.041 |
| 7,994,380 B2 * | 8/2011 | Singh et al. | .................... | 588/16 |
| 8,049,194 B2 * | 11/2011 | Nicholson et al. | ......... | 250/507.1 |
| 2005/0220258 A1 * | 10/2005 | Georgii | ........................ | 376/272 |
| 2009/0185652 A1 * | 7/2009 | Tamaki et al. | ................ | 376/272 |
| 2011/0172484 A1 * | 7/2011 | Singh et al. | .................... | 588/16 |

FOREIGN PATENT DOCUMENTS

| | | |
|---|---|---|
| DE | 3938519 A1 | 5/1991 |
| EP | 0158849 | 10/1985 |
| JP | 2-186300 | 7/1990 |
| JP | 2002-286891 | 10/2002 |

* cited by examiner

*Primary Examiner* — David A Vanore
(74) *Attorney, Agent, or Firm* — Hamre, Schumann, Mueller & Larson, P.C.

(57) ABSTRACT

The object of this invention is to provide a device and method for the dry intermediate storage of irradiated fuel elements. The apparatus includes a casing which includes tiered superposed modules made of thermally conductive material and having compartments for accommodating fuel elements with a heat sink arranged on a perforated support plate. The system includes a retaining system which includes a clearance space left between a top module of a tier and a support plate of a tier above the superposed module.

15 Claims, 4 Drawing Sheets

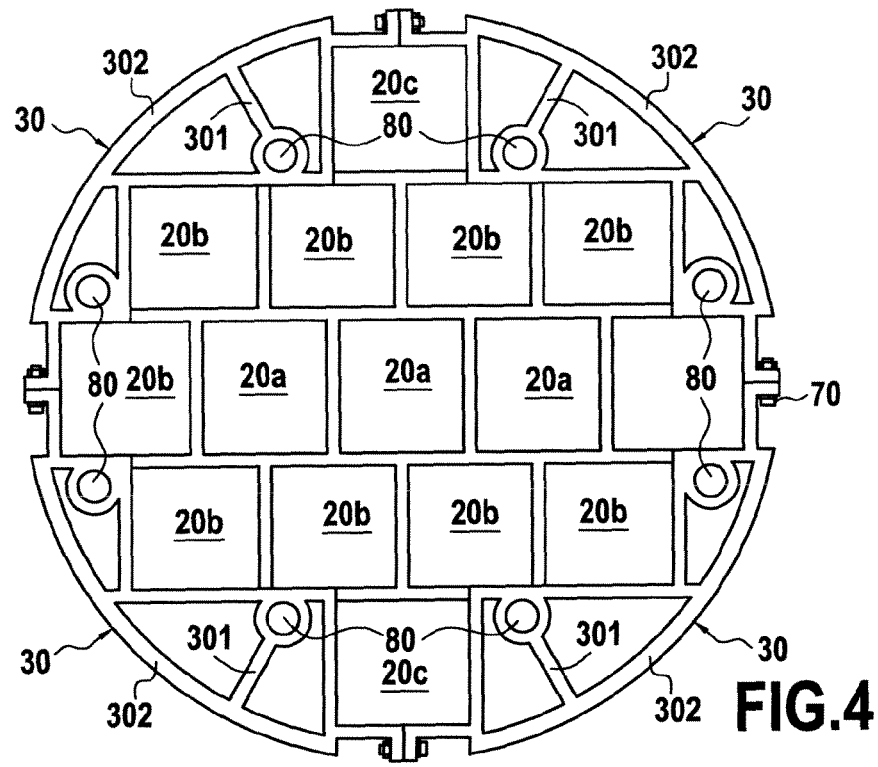
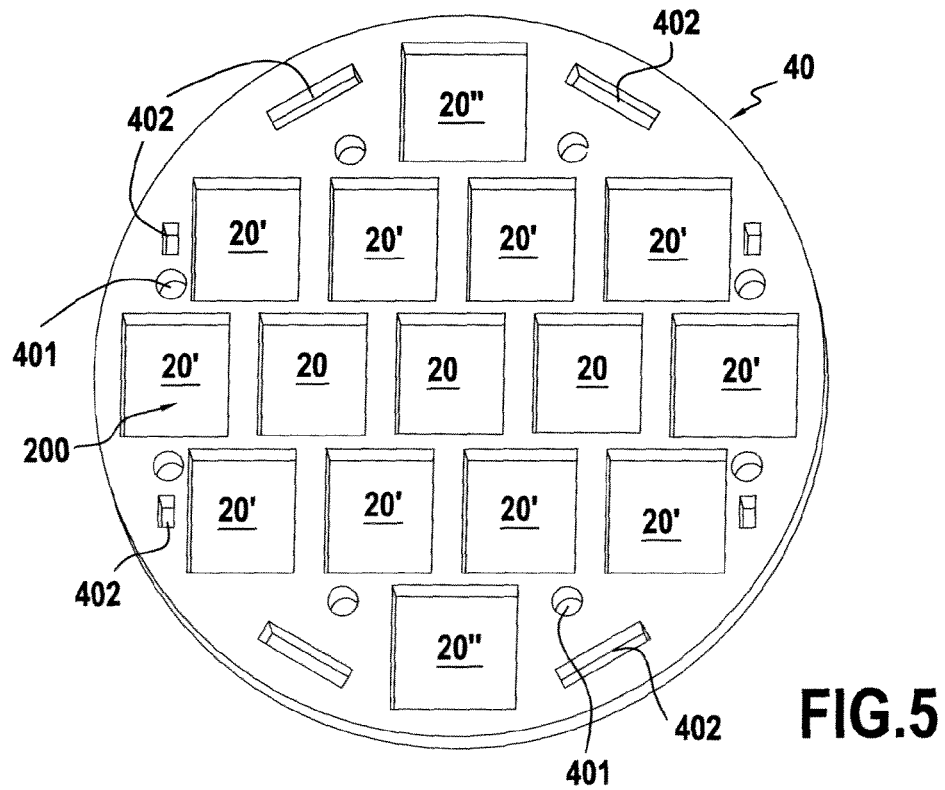

CASING INTERNAL PART AND CASING FOR THE DRY INTERMEDIATE STORAGE OF IRRADIATED FUEL ELEMENTS, AND INTERMEDIATE STORAGE METHOD

The subjects of the present invention are:
a casing internal part (a device for the internal arrangement of a casing; frame or rack internal to a casing) suited to the dry intermediate storage of at least one irradiated fuel element;
a dry intermediate storage casing equipped with such a casing internal part; and
a method for the dry intermediate storage of at least one irradiated fuel element, based on the use of such a casing and such a casing internal part.

The casing internal part according to the invention characteristically comprises a hybrid structure within which the thermal function is dissociated from the mechanical integrity function. This is explained later on.

In the following description of the invention now claimed, an irradiated fuel element is to be understood to mean an irradiated fuel element or a set of at least two superposed irradiated fuel elements. Such an irradiated fuel element has a vertical structure.

The invention has been developed in the context of the dry intermediate storage of irradiated fuel elements. Such irradiated fuel elements are conventionally temporarily stored:
either while they await conditioning suited to definitive permanent storage thereof (they are then processed as waste);
or awaiting processing/recycling in order to realize their asset value.

To date, dry intermediate storage of irradiated fuel elements is performed only on low power irradiated fuel elements. Managing the conduction of heat, in order to ensure cooling, is therefore not a critical issue. Said low-power elements, individually or superposed in twos, are placed in casings. Said casings are not equipped with retaining structures. Said casings are placed in frames, which frames are introduced into the ventilated pits.

In a related context, the problems of the dissipation of heat are managed. Thus, for transporting high-power irradiated fuel elements, use is made of special-purpose shipping casks. These are big, heavy, structures in which there are blocks of cast aluminum superposed on each other; said blocks stabilizing the irradiated fuel elements. Within said casks said blocks perform a thermal function and a mechanical integrity function.

The technical problem addressed in the context of the present invention has chiefly been that of the dry intermediate storage, individually or in batches, of fuel elements of a higher power (notably each having a power liable to be as high as 5 kW) than those temporarily stored in the prior art. It will be seen later on that the system of the invention is suited to the dry intermediate storage of several fuel elements in one and the same casing.

Irrespective of the power involved, it is quite obviously necessary to ensure that the irradiated fuel elements being temporarily stored are correctly cooled in order to avoid any degradation due to excessive temperature, so that the cladding of said fuel elements will maintain its integrity in the long term. The higher the power, the more critical this problem becomes.

The good conduction of the heat of the stored irradiated fuel element(s) toward the cooling system of the storage system becomes, in a high-power context, a very important or even crucial parameter. This conduction of heat has to be provided, quite obviously, while at the same time keeping the irradiated fuel element(s) in place, and stable within the temporary storage casing, and this means that the structure of the casing, including its casing internal part (internal arrangement) needs to maintain its geometry throughout the duration of the intermediate storage.

Faced with such a technical problem, the inventors are proposing an innovative and high-performance solution based on a novel casing internal part structure, this structure being a tiered hybrid structure with modules made of a material that is a good conductor of heat (advantageously aluminum) with hollowed-out heat sinks (heat dissipators).

According to its first object, the present invention therefore proposes novel casing internal parts. The concept of casing internal part is familiar to those skilled in the art. This may also be termed the internal arrangement device of a casing suited in this instance, to the stable positioning of the fuel elements that are to be temporarily stored inside it.

The casing internal parts according to the invention are therefore suited to the dry intermediate storage of at least one irradiated fuel element. They have a novel structure. Characteristically, they have
a tiered structure which comprises at least two superposed modules;
each of said modules, made of a material that is a good conductor of heat, with compartment(s) for accommodating said fuel element(s) in the central part and with at least one hollowed-out heat sink at the periphery (hereafter known as a hollowed-out peripheral heat sink), being arranged on a support plate that is perforated to allow said fuel element(s) through; the perforated support plates of said structure being positioned and assembled by means of a retaining system, with a clearance left between the top of the module of one tier and the perforated support plate of the tier immediately above.

As already mentioned, said structure is hybrid:
the thermal function is performed by means of modules made of a material that is a good conductor of heat (good conductor (good dissipater) of heat). What is meant in this text by materials which are good conductors of heat are materials the thermal conductivity of which is higher than 150 $W \cdot m^{-1} \cdot K^{-1}$. Such a definition is commonly accepted by materials specialists. Materials of this type (which have such thermal conductivity) are known, and commonly used at this time; other materials of this type (having such thermal conductivity) are likely to be developed in the future. A person skilled in the art is aware in particular of silver, copper, gold and aluminum. None of these metals is a priori set aside, by way of material of which the modules can be made. However, it will be appreciated that the use of silver or gold presents more particular problems in terms of cost and that the use of aluminum is sure to be preferred. Copper can of course be used, but the reason why aluminum is preferred will be explained hereafter. Copper and aluminum are both good conductors of heat but copper has the disadvantage of being more expensive to source and to use. This is because copper is far more difficult to adapt to suit the desired geometries than is aluminum. Aluminum is therefore the preferred material of which to form the modules of casing internal part according to the invention. It is a good conductor of heat (can undergo a surface treatment to improve its emissivity still further), it can be extruded and what is more it is light weight. However, it is well known that its mechanical strength decreases significantly with increasing temperature; hence the recourse to a support structure (see later). This remark may be entirely valid for some other material that is a good conductor of heat;

the function of mechanical integrity is afforded by means of a support structure: perforated support plates and retaining system. Said support structure is obviously made of a material with high mechanical strength, resistant to heat. It is advantageously made of stainless steel. It will be appreciated that other materials such as titanium may be suitable. It will be understood that, in terms of cost, stainless steel is preferred.

The compartment(s) of the modules and the opening(s) in the support plates and also the positioning of said modules and support plates are quite obviously suited to the vertical positioning of the fuel elements.

Each module comprises at least one compartment in the central part and at least one heat sink at the periphery. Characteristically, said peripheral heat sink is not a solid element but is a hollowed-out part (said peripheral sinks are not solid elements but are hollowed-out parts). Generally, there are several heat sinks arranged at the periphery of each module. In the context of the invention, the thermal function is performed with the amount of material needed being optimized, hence leading to substantial savings, particularly in a mass-production context.

According to an alternative form, the modules of the casing comprise a single compartment in the central part. Said single compartment is designed to accept an irradiated fuel element, a priori a high-power fuel element, of a power such that storing it together with another element will present problems (in terms of power).

According to another alternative form which is preferred, several compartments are arranged in the structure of each module that makes up the casing internal part. Said casing internal part is therefore designed for the intermediate storage of a batch of fuel elements so that several fuel elements can be temporarily stored at one and the same level . . . and in one and the same casing. This is novel: the prior art combines one casing internal part for one fuel element (or two superposed elements) with one casing, therefore one fuel element (or two superposed fuel elements) per casing. Incidentally, it might be noted that a casing internal part designed for the intermediate storage of n fuel elements (comprising modules with n compartments) is entirely suited to the intermediate storage of m fuel elements: m≦n. The choice of the value of m will be made as a function of numerous parameters particularly as a function of the thermal power involved.

In either one of the above alternative forms, each vertical housing created by the alignment of the compartments in the superposed modules is therefore able to accept a single irradiated fuel element or a set of at least two superposed irradiated fuel elements.

A functional clearance is left between the top of one module and the perforated support plate situated immediately above. This arrangement allows free (stressless) expansion of this module (advantageously made of aluminum), the expansion of which may exceed that of some of the elements of the retaining system (of the stainless steel through bolt type for example (see later)). Incidentally, it might be noted here that the upper perforated "support" plate does not support any module. It is termed a support plate simply by analogy. It is advantageously identical to the other support plates, although this is not compulsory.

The casing internal part according to the invention therefore comprises superposed modules, each of said modules comprising one (or more) compartment(s) suited to receiving the irradiated fuel element(s) and at least one hollowed-out peripheral heat sink which removes the heat from said fuel element(s) toward the wall of the casing (in which said casing internal part is to be placed).

Advantageously, the constituent elements of a module—compartment(s)+heat sink(s)—are extruded elements (elements obtained by extrusion).

The height of the modules is determined by mechanical calculation and by production feasibility. The heights involved, of the order of one meter per module, make for ease of manufacture of the modules (notably made of aluminum) by extrusion. Such an industrial implementation is particularly advantageous in that it makes it possible to limit the cost of said modules.

The number of modules of a casing internal part is obviously tailored to the length of the fuel element(s) to be temporarily stored within said casing internal part. This number is therefore generally dependent on said length and on the manufacturing technologies involved. By way of an indication, the tiered structure of a casing internal part according to the invention may thus comprise 2, 3, 4, 5 or 6 tiers (=2, 3, 4, 5 or 6 superposed modules). In any event, this indication is entirely non-limiting.

In general, and more particularly in this advantageous context of extruded elements used to form the modules, the at least one peripheral heat sink (the (only) peripheral heat sink or the peripheral heat sinks) of said module is very advantageously based on an extruded element with or without fin(s) and with radiating surface(s). Said at least one peripheral heat sink can thus be optimized in terms of weight, performance, cost, ease of manufacture, etc. Within a casing of circular cross section there is advantageously a casing internal part which is likewise of circular cross section, and therefore very advantageously at least one peripheral heat sink with curved radiating surface(s) (and with or without fin(s)).

The modules of the casing internal parts of the invention are thus advantageously made up of several extruded elements which are joined together by screw fastening or by any other method of assembly (for example welding) and which are positioned precisely, for example using pegs. One of said (pre-existing) extruded elements may thus consist of at least one prefabricated compartment. Starting from said at least one prefabricated compartment it is possible, by adding further extruded elements, to construct the module (with central compartment(s) and peripheral heat sink(s)). For smaller (simple) geometries, the module can be produced as a single extruded part.

The wall thickness of the modules, or more specifically, the thickness of the walls of the at least one compartment (of the (only) compartment or of the compartments) and of the heat sink(s) is advantageously optimized to ensure good conduction of heat for the lowest possible mass (notably of aluminum).

The geometry and the capacity for the intermediate storage of fuel elements of a casing internal part of the invention is determined by thermal calculations: these are dependent on the power of the fuels to be temporarily stored. The number of compartments is therefore tailored to the power of the fuel to be stored. The shape of said compartments is quite obviously tailored to, or even optimized in relation to, the shape of said fuels to be temporarily stored. A casing internal part of the invention (of circular cross section) thus advantageously comprises 1, 4, 7, 12 or 15 compartments (of square cross section); this corresponds to the optimum filling of a circle with compartments of square cross section. Such an optimum is desired in order to obtain the best capacity for intermediate storage. Incidentally, it might be noted, however, that the casing internal part of the invention and its associated casing are not necessarily of circular cross section, that the compartments are not necessarily of square cross section and it will also incidentally be recalled that the intermediate storage may be carried out with some compartments empty (in which case it is not optimized). Obviously, optimization is advantageously in terms of the number of compartments and the shape of said compartments, on the one hand (with reference to the structure of the casing internal part) and in terms of the number of compartments occupied, on the other hand (with reference to the employed method of intermediate storage in a casing equipped with a casing internal part according to the invention). The person skilled in the art has the ability to make these optimizations.

The support structure of a casing internal part according to the invention therefore encompasses the perforated support plates (each module rests on such a plate, which is perforated to allow the fuel element(s) to pass) and the retaining system that holds the set of said plates.

In order to perform its function, said support structure is made of a material with very good mechanical strength. It was seen earlier that it is advantageously made of stainless steel. It was also seen earlier that the material of which the modules are made is advantageously aluminum. Very advantageously, aluminum modules are combined in a casing internal part of the invention with a support structure made of stainless steel.

The retaining system advantageously comprises through bolts which perform a dual function. Firstly, they position and assemble the various support plates, and secondly, they can be used to transfer load from the casing internal part to the casing in which it is intended to be housed. Very advantageously, these same through bolts are used for (stably) positioning each module on its support plate. In the context of this highly advantageous alternative form, said through bolts therefore perform a triple function.

Such through bolts are therefore advantageously made of stainless steel. In the context of a preferred embodiment, through bolts, the length of which corresponds to that of a tier (of a module) are plugged together by screw fastening and have to be stabilized in the same way (by screw fastening) at the bottom and top parts of the casing internal part. There are generally three through bolts involved in each tier.

In the structure of the casing internal part according to the invention, the load of a module is reacted via each support plate and via the retaining system (the through bolts in the advantageous alternative form explained hereinabove). As a result, a module of said structure does not experience the weight of the module situated above it and the mechanical stress applied to it is thus lower, and compatible with the mechanical properties of the material (preferably aluminum) of which it is made. The load of the entire casing internal part is to be borne by the casing (the bottom of the casing) within which said casing internal part is intended to be positioned.

It was indicated hereinabove entirely non-limitingly that the casing internal part according to the invention may notably comprise 2, 3, 4, 5 or 6 tiers (2, 3, 4, 5 or 6 superposed modules).

Entirely non-limitingly, it may also be indicated here that the compartments of the modules are of square, hexagonal or circular cross section. In any event, said cross section needs to be suitable for said compartments to accommodate the fuel elements. The openings in the support plates have likewise to be suitable. Said compartments and said openings are generally the same shape and the same size.

The above is illustrated non-limitingly by the attached figures.

A second subject of the present invention is a casing for the dry intermediate storage of at least one irradiated fuel element. Characteristically, said casing contains a casing internal part like those described hereinabove (first subject of the present invention) and comprises a bottom capable of withstanding the mass of said casing internal part and that of said at least one fuel element intended to rest thereon (that of the (only) fuel element intended to rest thereon or that of the fuel elements intended to rest thereon). What is meant by the bottom of said casing is the structure thereof on which the casing internal part and the lower part of said at least one stored fuel element rest once said fuel element has been passed through the lower support plate (the support plate of the first tier of the first module) of the casing internal part. Opposite said bottom, said casing can obviously be fitted with a lid so as to form a sealed casing.

Advantageously, said casing of the invention and its casing internal part have cross sections of substantially the same dimension(s) (of substantially the same diameter assuming the most frequent case where said casing and casing internal part are right cylinders of circular cross section). In any event, said casings and casing internal parts advantageously have the shape of right cylinders. The clearance between the casing of the invention and its casing internal part is advantageously as small as possible, with a view to optimizing the dissipation of heat. However, it must allow said casing internal part to be introduced into and positioned in said casing, i.e. it must allow the modules to be fitted into the casing.

The casing internal part is advantageously stabilized in the casing. Thus, retaining systems suited to preventing said casing internal part (or the modules thereof) from moving around inside the casing, more particularly if said casing is knocked over, may thus be provided.

The third subject of the present invention relates to a method for the dry intermediate storage of at least one irradiated fuel element (a single) irradiated fuel element or irradiated fuel elements. Conventionally, said method comprises:
  the stable conditioning of said at least one irradiated fuel element in a casing within which the heat released by said at least one element is dissipated with no adverse effect on the structure of said at least one element,
  the intermediate storage of said sealed casing in a vertical pit cooled by the circulation of air.

Characteristically, the casing used in the context of said method is a casing of the invention (second subject of the present invention), that is to say a casing equipped with a casing internal part of the invention (first subject of the present invention).

Such a casing optimizes the intermediate storage by allowing the maximum of fuel (the maximum power in fact) to be stored temporarily in the smallest amount of space.

According to some particularly preferred alternative forms of embodiment:
  the method of the invention is implemented using a casing containing several fuel elements (at one and the same level); and/or
  said method of the invention involves the intermediate storage of at least one high-power fuel element (of a power up to 5 kW; for example from a light water reactor).

The method of the invention is not restricted to its particularly preferred alternative forms of implementation. Thus, it may be as suited to the intermediate storage of a single high-power fuel element as it is to the intermediate storage of a single or of several low or lower power fuel elements. If it is capable of heavy duty then it is also capable of light duty. It will be recalled that the structure of the casing involved has been optimized for the maximum removal of released heat.

The invention will now be described with reference to the attached figures. Said figures show two embodiments of a device (casing internal part) of the invention.

Figure 2:
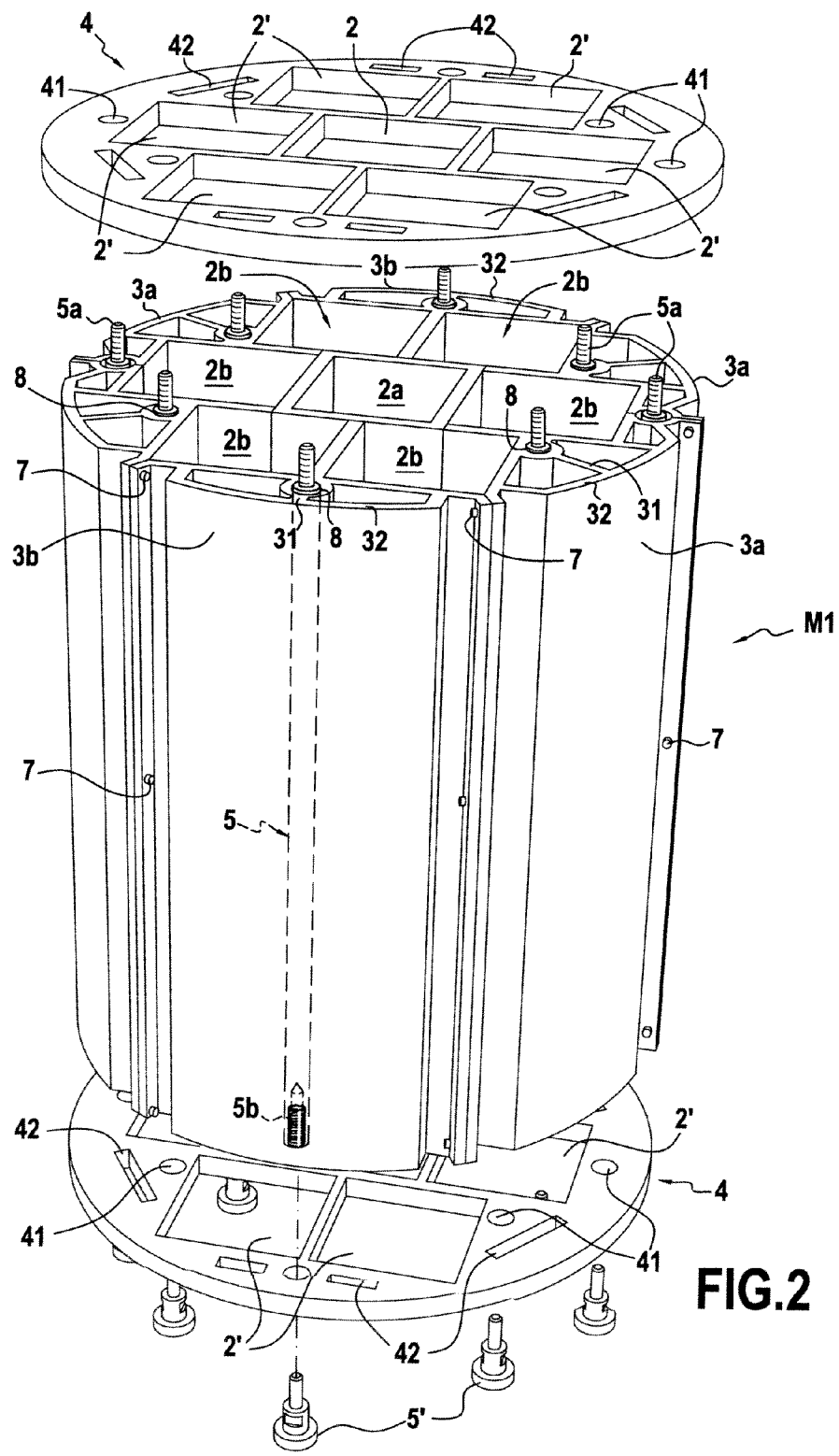
FIG. 2 is an exploded perspective view of a module of the casing internal part shown in FIG. 1, between two support plates.
Figure 3A:
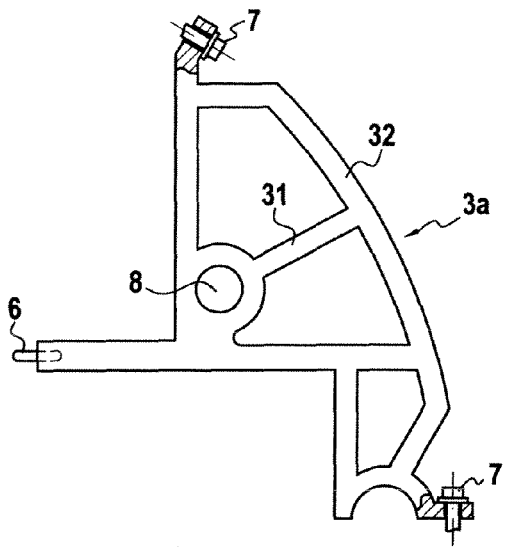
Figure 3B:
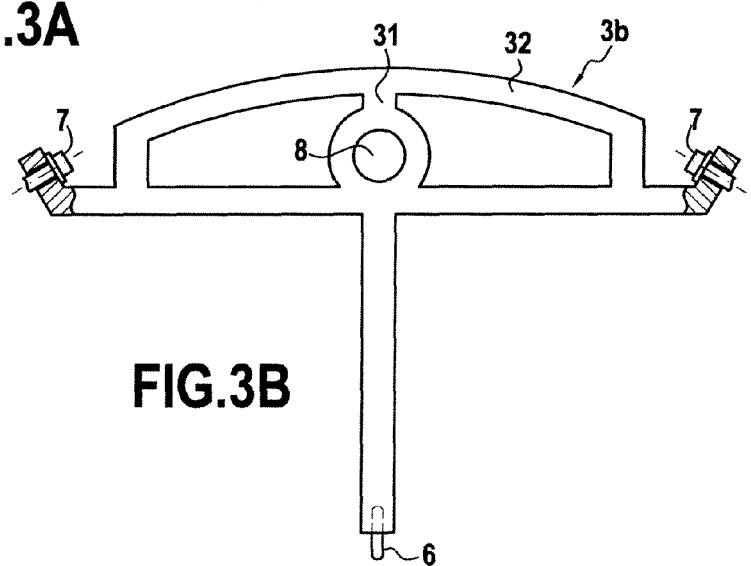
Figure 3C:
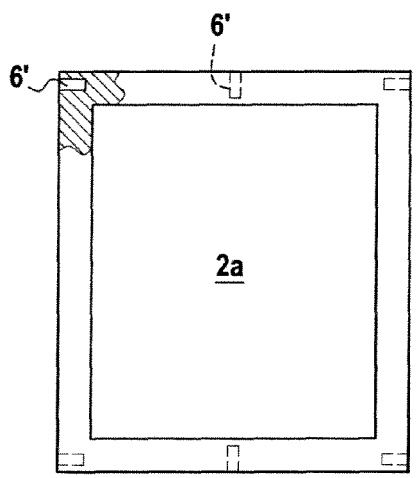

FIGS. 3A, 3B and 3C are plan views of the elements that make up the module shown in FIG. 2. More specifically, FIG. 3A shows a corner peripheral heat sink; FIG. 3B a T-shaped peripheral heat sink and FIG. 3C the central compartment.

FIG. 4 is a plan view of a module of a casing internal part according to another embodiment.

FIG. 5 is a perspective view of a support plate of a casing internal part according to said other embodiment.

Figure 1:
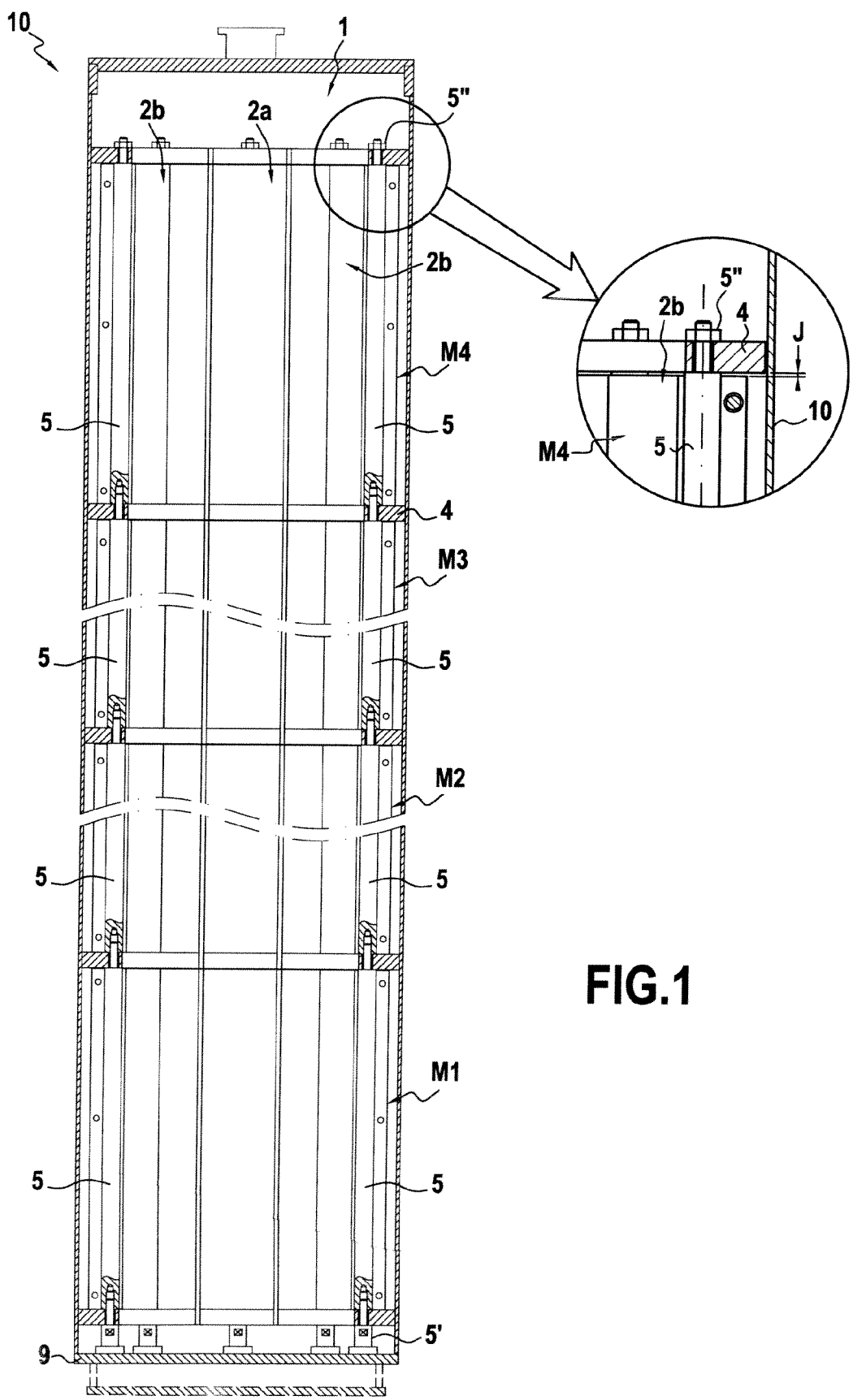
FIG. 1 is a view in longitudinal section of a casing of the invention, that is to say of a casing fitted with a casing internal part of the invention. Said casing is shown, empty, with no irradiated fuel element placed within it.

FIG. 1 therefore shows a casing internal part 1 arranged inside a casing 10. Said casing internal part 1 and casing 10 are of cylindrical shape (have the shape of right cylinders of circular cross section).

The casing internal part 1 comprises four tiers. Its structure comprises four modules M1, M2, M3 and M4 each positioned on a perforated support plate 4. A clearance 3 is left between the top of each module (such a clearance allows said module, notably made of aluminum, free expansion) and the support plate of the module of the tier above.

The compartments 2a (central) and 2b ($1^{st}$ ring) of the four modules M1, M2, M3 and M4 and the corresponding openings 2 (central) and 2' ($1^{st}$ ring) in the support plate 4 (see FIG. 2) are obviously made to coincide so as to generate within the structure of the casing internal part 1 vertical housings for the fuel elements.

The through bolts 5 are used, in the context of the advantageous embodiment depicted:
  to position and assemble the support plates 4 with respect to one another,
  to transfer load from the casing internal part 1 to the casing 10. A fixing screw for a lower through bolt 5 positioned on the bottom part 9 of the casing 10 has been depicted as 5' and a fixing nut for an upper through bolt 5 to the upper "support" plate 4 of the casing internal part 1 has been depicted as 5". It will thus be appreciated that load from one module M1 is reacted via each support plate 4 and the through bolts 5 and that in this way the load of the entire casing internal part 1 is borne by the casing 10,
  to position each of the modules M1, M2, M3 and M4 on its respective support plate 4 (see FIG. 2).

FIG. 2 therefore shows the lower module M1 (identical to the other modules M2, M3 and M4) and the lower support plate 4 (the support plate for said module M1) and the intermediate support plate 4 (support plate for the module M2 formed between said modules M1 and M2).

The module M1 comprises seven compartments: the central compartment 2a, prefabricated, and six ring compartments 2b obtained by construction, following the fitting of the peripheral heat sinks 3a and 3b. These heat sinks have hollowed-out structures with two types of geometry. They are shown in said FIG. 2 and in FIGS. 3A and 3B. The heat sinks 3a, of which there are four, are corner heat sinks; the heat sinks 3b, of which there are two, are T-shaped. Said heat sinks 3a and 3b have geometries that are optimized in relation to their performance, for the weight/performance/ease of construction compromise. These are therefore hollowed-out structures obtained by extrusion, with fin 31 and curved radiating surface 32 which are particularly beneficial with respect to thermal radiation.

In the structure of said heat sinks 3a and 3b there are housings 8 for the through bolts 5. Said through bolts 5 have their ends 5b and 5a threaded so that they respectively collaborate at the bottom with the fixing screws 5' (if M1 is the module of the first tier of the casing internal part 1) and, at the top, with the threaded lower end 5b of the through bolt 5 of the module M2 (of the tier above, not depicted). The end 5a of the through bolt 5 of the module M4 is itself called upon to collaborate with the fixing nut 5" (refer to FIG. 1 and the above description of said figure).

The central compartment 2a is positioned at the center of the other elements (heat sinks 3a and 3b) using centering pegs 6. It will be realized, on studying FIGS. 3A, 3B and 3C, that, within the wall thickness of said central compartment 2a there are in fact housings 6' for said centering pegs 6, provided on the heat sinks 3a and 3b. Said heat sinks 3a and 3b (six peripheral elements) are joined together by screw fastening. The screws involved are depicted schematically as 7.

FIG. 2 clearly shows that, according to the advantageous embodiment depicted, the through bolts 5 provide the stable positioning of the module M1 (of its constituent compartments 2a and 2b) on the (lower) support plate 4.

The support plates 4 (lower plate, support for the module M1, and upper plate, support for the module M2) are obviously perforated to allow the fuel elements that are to be stored in the casing 1 to pass, that is to say that said plates 4 have openings 2 and 2' which, respectively, are in register with the compartments 2a and 2b. Said plates 4 also have holes 41 for the passage of the through bolts 5. These holes 41 more specifically, in the case of the lower plate, are where the lower ends of the through bolts 5 (depicted) are secured to the fixing screws 5' and where, in the case of the upper plate, the upper ends of said through bolts 5 are secured to the lower ends of the through bolts 5 which have not been depicted in FIG. 2 (but which are depicted in FIG. 1) of the module M2 of the tier above. Said plates 4 finally have slots 42 providing communication between the tiers of the casing internal part 1 positioned inside the casing 10.

From studying FIGS. 4 and 5 it will be appreciated that, according to the second embodiment depicted, the casing internal part of the invention comprise fifteen compartments: three so-called central compartments 20a, ten compartments said to be of a first ring 20b and two said to be of a second ring 20c.

The set of compartments is produced from simple pieces of section piece, obtained by extrusion then assembled by spot welds at their ends. In the case of the compartments located around the periphery of the set, devices, also assembled by spot welds, are installed to join the compartments together and ensure correct positioning of the set in relation to the peripheral heat sinks 30.

The module depicted therefore is essentially the result of assembling a first component comprising the compartments 20a and certain walls of the compartments 20b and 20c and the four peripheral heat sinks 30.

Said heat sinks 30 are hollowed-out extruded elements. They have fins 301 and curved radiating surfaces 302 and the passages 80 for the through bolts (not depicted). The fixing screws that join said heat sinks 30 together have been depicted as 70.

On the support plate 40 (FIG. 5) we again find:
  the openings 20, 20' and 20" which are respectively in register with the compartments 20a, 20b and 20c;

the holes 401 (in register with the passages 80) for the passage of the through bolts;

the slots 402 providing communication between the tiers.

The invention is finally illustrated through the following two examples.

EXAMPLE 1

A casing internal part 1 like the one depicted in FIGS. 1 and 2 is produced.

Said casing internal part comprises 4 aluminum modules 1080 mm tall, each resting on a perforated horizontal plate made of stainless steel.

Each module is therefore made of 7 elements, with the three different geometries:

a central compartment, two T-shaped peripheral heat sinks, and four corner peripheral heat sinks and comprises 7 compartments (see FIGS. 1, 2, 3A, 3B and 3C and the above description thereof).

Said casing internal part has been positioned in a stainless steel casing with a clearance of 3 mm on the radius. The casing internal part/casing arrangement is as depicted in FIG. 1.

The casing obtained can therefore accept up to seven irradiated fuel elements, notably of the PWR (pressurized water reactor) type. Such a casing, with 7-comparatment casing internal part, is perfectly suited to the dry intermediate storage of PWR 900 irradiated fuel elements; the thermal power of such an irradiated fuel element can be as high as 1.6 kW. Such a power of 1.6 kW corresponds to the residual thermal power of a fuel element of 900 MW PWR type stored 5 years after entering the reactor.

Such a casing is also able to accommodate sets (of appropriate overall height) of superposed irradiated fuel elements.

EXAMPLE 2

A casing internal part is produced with modules of the kind depicted in FIG. 4 and with support plates of the kind depicted in FIG. 5 (casing internal part "analogous" to those depicted in FIG. 1).

Said casing internal part comprises four aluminum modules 1080 mm tall, each resting on a perforated horizontal plate made of stainless steel.

Each module therefore comprises:

a set making up the body of 15 compartments, and four hollowed-out peripheral heat sinks completing the belt around the peripheral compartments.

Said casing internal part has been positioned in a stainless steel casing with a clearance of 3 mm on the radius. The casing internal part/casing arrangement is of the kind depicted in FIG. 1.

The casing obtained is therefore able to accommodate up to 15 irradiated fuel elements, notably BWR (boiling water reactor) fuel of 8×8 type. such a casing, with a 15-compartment casing internal part, is perfectly suited to the dry intermediate storage of BWR irradiated fuel of 8×8 type; the thermal power of such an irradiated fuel element may be as much as 0.6 kW.

Such a casing is also able to accommodate sets (of suitable overall height) of superposed irradiated fuel elements.

The invention claimed is:

1. A casing internal part suitable for the dry intermediate storage of at least one irradiated fuel element, characterized in that it has a tiered structure which comprises at least two superposed modules, each of said modules, made of a material that is a good conductor of heat, with compartment(s) for accommodating said fuel element(s) in the central part and with at least one hollowed-out peripheral heat sink, being arranged on a support plate that is perforated to allow said fuel element(s) through; the perforated support plates of said structure being positioned and assembled by means of a retaining system, with a clearance left between the top of the module of one tier and the perforated support plate of the tier immediately above.

2. The casing internal part as claimed in claim 1, characterized in that said at least one compartment and said at least one hollowed-out pheriphal heat sink of each module are based on extruded elements.

3. The casing internal part as claimed in claim 2, characterized in that each module of its tiered structure comprises at least one prefabricated compartment.

4. The casing internal part as claimed in claim 1, characterized in that said at least one hollowed-out peripheral heat sink is an extruded element with or without fin(s) and with radiating surface(s).

5. The casing internal part as claimed in claim 1, characterized in that each module of its tiered structure comprises 1, 3, 4, 7, 12 or 15 compartments.

6. The casing internal part as claimed in claim 1, characterized in that said modules are made of aluminum; and/or, advantageously and, said retaining system and said perforated support plates are made of a material with high mechanical strength and are advantageously made of stainless steel.

7. The casing internal part as claimed in claim 1, characterized in that said retaining system comprises through bolts for, on the one hand, positioning and assembling the support plates and, on the other hand, transferring load from said casing internal part to the casing in which it is intended to be housed.

8. The casing internal part as claimed in claim 7, characterized in that said through bolts position each module on its support plate.

9. The casing internal part as claimed in claim 1, characterized in that its tiered structure comprises 2, 3, 4, 5 or 6 superposed modules.

10. The casing internal part as claimed in claim 1, characterized in that said at least one compartment has a square, hexagonal or circular cross section.

11. A casing suited to the dry intermediate storage of at least one irradiated fuel element, characterized in that it contains a casing internal part as claimed in claim 1 and comprises a bottom capable of withstanding the mass of said casing internal part and that of said at least one fuel element that is going to rest against it.

12. The casing as claimed in claim 11, characterized in that said casing and its casing internal part, which advantageously adopt the shape of right cylinders, have cross sections of roughly the same dimension(s).

13. A method for the dry intermediate storage of at least one irradiated fuel element comprising:

the stable conditioning of said at least one irradiated fuel element in a casing within which the heat released by said at least one element is dissipated with no adverse effect on the structure of said at least one element, the intermediate storage of said sealed casing in a vertical pit cooled by the circulation of air, characterized in that said casing is a casing as claimed in claim 1.

14. The method as claimed in claim 13, characterized in that said casing contains several fuel elements.

15. The method as claimed in claim 13, characterized in that said at least one irradiated fuel is an element the power of which is 5 kW or lower.

* * * * *